United States Patent
Yang et al.

(10) Patent No.: US 9,998,925 B2
(45) Date of Patent: Jun. 12, 2018

(54) ELECTRONIC SUBSCRIBER IDENTITY MODULE PROVISIONING

(71) Applicant: Apple Inc., Cupertino, CA (US)

(72) Inventors: Xiangying Yang, Cupertino, CA (US); Li Li, Los Altos, CA (US); Jerrold Von Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/619,167

(22) Filed: Jun. 9, 2017

(65) Prior Publication Data

US 2017/0280328 A1    Sep. 28, 2017

Related U.S. Application Data

(63) Continuation of application No. 14/715,761, filed on May 19, 2015, now Pat. No. 9,730,072.
(Continued)

(51) Int. Cl.
*H04L 29/06* (2006.01)
*H04W 12/08* (2009.01)
(Continued)

(52) U.S. Cl.
CPC .......... *H04W 12/08* (2013.01); *G06F 21/33* (2013.01); *G06F 21/34* (2013.01); *G06F 21/602* (2013.01);
(Continued)

(58) Field of Classification Search
None
See application file for complete search history.

(56) References Cited

U.S. PATENT DOCUMENTS 9,247,424 B2 *   1/2016   Haggerty ............... H04W 12/06
9,344,832 B2     5/2016   Schell et al.
(Continued)

FOREIGN PATENT DOCUMENTS

CN      102572805 A     7/2012
EP       2448215 A1     5/2012
(Continued)

OTHER PUBLICATIONS

Gsm Association, "Remote Provisioning Architecture for Embedded UICC Technnical Specification", ver. 3.1, May 2016, GSM Association, p. 1-297.*
(Continued)

*Primary Examiner* — Jeffery Williams
(74) *Attorney, Agent, or Firm* — Dickinson Wright RLLP (57) ABSTRACT

A method for preparing an eSIM for provisioning is provided. The method can include a provisioning server encrypting the eSIM with a symmetric key. The method can further include the provisioning server, after determining a target eUICC to which the eSIM is to be provisioned, encrypting the symmetric key with a key encryption key derived based at least in part on a private key associated with the provisioning server and a public key associated with the target eUICC. The method can additionally include the provisioning server formatting an eSIM package including the encrypted eSIM, the encrypted symmetric key, and a public key corresponding to the private key associated with the provisioning server. The method can also include the provisioning server sending the eSIM package to the target eUICC.

20 Claims, 8 Drawing Sheets

Related U.S. Application Data (60) Provisional application No. 62/002,301, filed on May 23, 2014.

(51) Int. Cl.

| | | |
|---|---|---|
| *G06F 21/60* | (2013.01) | |
| *G06F 21/33* | (2013.01) | |
| *H04L 9/08* | (2006.01) | |
| *H04L 9/32* | (2006.01) | |
| *H04W 12/06* | (2009.01) | |
| *G06F 21/34* | (2013.01) | |
| *H04W 8/20* | (2009.01) | |

(52) U.S. Cl.
CPC .......... *H04L 9/0822* (2013.01); *H04L 9/0825* (2013.01); *H04L 9/0877* (2013.01); *H04L 9/3234* (2013.01); *H04L 63/0853* (2013.01); *H04W 12/06* (2013.01); *G06F 2221/2107* (2013.01); *H04L 2209/80* (2013.01); *H04W 8/205* (2013.01)

(56) References Cited

U.S. PATENT DOCUMENTS

| | | | | |
|---|---|---|---|---|
| 9,426,654 B2* | 8/2016 | Lee | ...................... | H04W 12/06 |
| 9,438,600 B2 | 9/2016 | Haggerty et al. | | |
| 9,521,547 B2 | 12/2016 | Park et al. | | |
| 9,532,219 B2* | 12/2016 | Schell | .................. | H04W 4/001 |
| 2008/0130879 A1 | 6/2008 | Heinonen et al. | | |
| 2012/0108205 A1* | 5/2012 | Schell | .................. | H04W 4/001 |
| | | | | 455/411 |
| 2013/0121493 A1 | 5/2013 | Von Behren et al. | | |
| 2013/0227646 A1* | 8/2013 | Haggerty | ............ | H04L 63/0853 |
| | | | | 726/3 |
| 2014/0073375 A1 | 3/2014 | Li et al. | | |
| 2014/0219447 A1 | 8/2014 | Park et al. | | |
| 2014/0287725 A1* | 9/2014 | Lee | ...................... | H04W 12/06 |
| | | | | 455/411 |
| 2015/0341791 A1* | 11/2015 | Yang | ..................... | H04W 12/06 |
| | | | | 713/159 |
| 2015/0347786 A1* | 12/2015 | Yang | ..................... | H04W 8/183 |
| | | | | 726/26 |
| 2016/0006729 A1* | 1/2016 | Yang | .................. | H04L 63/0853 |
| | | | | 713/156 |
| 2016/0226877 A1* | 8/2016 | Haggerty | ............ | H04L 63/0853 |
| 2016/0277930 A1* | 9/2016 | Li | ........................... | H04L 41/28 |
| 2016/0330624 A1* | 11/2016 | Lee | ...................... | H04W 12/06 |

FOREIGN PATENT DOCUMENTS

| | | |
|---|---|---|
| JP | H11346210 A | 12/1999 |
| JP | 2012120163 A | 6/2012 |
| JP | 2015512209 A | 4/2015 |
| KR | 20130026352 A | 3/2013 |
| KR | 1020130026351 A | 3/2013 |
| KR | 1020130049726 A | 5/2013 |
| TW | 201251483 A | 12/2012 |
| WO | 2013036009 A1 | 3/2013 |
| WO | 2013123233 A2 | 8/2013 |

OTHER PUBLICATIONS

European Patent Application No. 15796875.1—Extended Search Report dated Nov. 8, 2017.
Japanese Patent Application No. 2016-565503—Final Rejection dated Oct. 10, 2017.
Korean Patent Application No. 10-2016-7031631—Preliminary Rejection dated Jul. 14, 2017.
GSM Association, "Remote Provisioning Architecture for Embedded UICC Technical Specification", ver. 3.1, May 2016, p. 1-297.
PCT Application No. PCT/US2015/031760—International Search Report & Written Opinion dated Sep. 7, 2015.
Taiwanese Patent Application No. 104116558—Search Report dated May 7, 2016.
Japanese Patent Application No. 2016-565503—Office Action dated May 22, 2017.
GlobalPlatform Card "Security Upgrade for Card Content Management Card Specification V 2.2—Amendment E", Version 1.0, Public Release, Nov. 2011, 35 pages.

\* cited by examiner

ELECTRONIC SUBSCRIBER IDENTITY MODULE PROVISIONING

CROSS-REFERENCE TO RELATED APPLICATIONS

The present application is a continuation of U.S. application Ser. No. 14/715,761, filed May 19, 2015, entitled "ELECTRONIC SUBSCRIBER IDENTITY MODULE PROVISIONING," which claims the benefit of U.S. Provisional Application No. 62/002,301 filed May 23, 2014 of the same title, the contents of which are incorporated herein by reference in their entirety for all purposes.

FIELD

The described embodiments relate generally to wireless communications technology. More particularly, the present embodiments relate to electronic Subscriber Identity Module (eSIM) provisioning to embedded Universal Integrated Circuit Cards (eUICCs).

BACKGROUND

Wireless communication devices, such as smart phones, have traditionally been configured to utilize Universal Integrated Circuit Cards (UICCs) that provide access to wireless network services. A UICC typically takes the form of a small removable card (e.g., a Subscriber Identity Module (SIM) card) that is inserted into a wireless communication device. In most cases, each UICC is associated with a single "Issuer"—such as a mobile network operator—that controls the programming and distribution of the UICC.

In more recent implementations, non-removable UICCs—referred to herein as embedded UICCs (eUICCs)—are being included on system boards of wireless communication devices. These eUICCs are distinct from the traditional removable UICCs in that the eUICCs are non-removable and soldered to the system boards of wireless communication devices. An eUICC can be programmed with one or more eSIMs, each of which can emulate and replicate the architecture of a typical SIM so as to enable a wireless communication device including the eUICC to access wireless network services.

The use of eUICCs and eSIMs can offer significant advantages over traditional UICCs. For example the use of an eUICC can provide device manufacturers with increased flexibility in device design due to the lack of a requirement to design the device to accommodate the size and form factor of a removable SIM card. As a further example, the ability to remotely provision (e.g., over-the-air) eSIMs can provide convenience for consumers and vendors when configuring a device to access a mobile network operator's network.

Existing approaches for securely preparing and provisioning an eSIM fail to address system scalability issues in situations in which a provisioning server concurrently provisions eSIMs to several eUICCs. In this regard, many existing approaches for provisioning eSIMs, such as that specified by the GlobalPlatform™ Specification, encrypt the eSIM with a key that is specific to a target eUICC. This approach prevents encryption of the eSIM prior to initiation of a provisioning session, as the target eUICC must be identified before the eSIM can be encrypted for provisioning using the key that is specific to the target eUICC. The overhead required to derive the appropriate encryption key and encrypt the eSIM in real-time during a provisioning session can be particularly burdensome when a provisioning server is concurrently provisioning eSIMs to several eUICCs, such as around the time of a new product release.

SUMMARY

Some example embodiments provide methods, apparatuses, and computer program products for eSIM provisioning that address some of the aforementioned deficiencies in prior approaches. For example, some embodiments enable the encryption of an eSIM prior to identification of the target eUICC to which the eSIM is to be provisioned, thereby reducing the amount of time and overhead required to provision an eSIM during a provisioning session and improving provisioning server scalability. More particularly, some example embodiments provide for pre-preparation of an eSIM before a target eUICC is identified by encrypting the eSIM with a symmetric key that is not specific to any particular eUICC. When a target eUICC is identified, such as when a provisioning session is initiated, the symmetric key can be encrypted with a key encryption key that is derivable by the target eUICC. The encrypted symmetric key can be included in an eSIM package including the encrypted eSIM, which can be sent to the target eUICC. As such, rather than requiring encryption of the entire eSIM during the provisioning session, in some example embodiments only the symmetric key used to encrypt the eSIM in advance of the provisioning session may need to be encrypted in real-time during the provisioning session. The symmetric key is substantially smaller than the eSIM, in many cases being on the order of only 128 bits in length. As such, the amount of time and processing overhead needed to encrypt the symmetric key can be substantially less than that needed to encrypt the eSIM, thereby reducing the time and overhead required for preparing and provisioning an eSIM during a provisioning session and improving system scalability.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The GlobalPlatform™ Specification, in particular Version 1.0 of the Security Upgrade for Card Content Management Card Specification version 2.2—Amendment E from November 2011, the contents of which are incorporated herein by reference, specifies a key agreement scheme in which a provisioning service and an eUICC engage in a real-time key agreement protocol during a provisioning session. A key derived by the provisioning service attendant to the key agreement protocol is used to encrypt the eSIM. As such, encryption of the eSIM cannot be performed until key derivation via the key agreement protocol has been completed, thereby requiring the eSIM to be encrypted in real-time during a provisioning session. The overhead required to perform the key derivation and encrypt the eSIM in real-time during a provisioning session is problematic in terms of system scalability during periods in which the provisioning service is concurrently provisioning eSIMs to several eUICCs, such as around the time of a new product release.

Some example embodiments disclosed herein address these scalability issues by allowing a provisioning server to generate and encrypt an eSIM before knowing the target eUICC (e.g., to perform "offline" eSIM generation and encryption) while still complying with the key agreement call flow specified by the GlobalPlatform™ Specification. More particularly, some example embodiments provide for pre-preparation of an eSIM before a target eUICC is identified by encrypting the eSIM with a symmetric key that is not specific to any particular eUICC. When a target eUICC is identified, such as when a provisioning session is initiated, the symmetric key can be encrypted with a key encryption key that is derivable by the target eUICC (e.g., in accordance with a key agreement protocol). The encrypted symmetric key can be included in an eSIM package including the encrypted eSIM, which can be sent to the target eUICC. As such only the symmetric key used to encrypt the eSIM in advance of the provisioning session may need to be encrypted in real-time during the provisioning session, rather than the entire eSIM. The symmetric key is substantially smaller than the eSIM, in many cases being on the order of only 128 bits in length. The amount of time and processing overhead needed to encrypt the symmetric key is thus generally substantially less than that needed to encrypt the eSIM, thereby reducing the time and overhead required for preparing and provisioning an eSIM during a provisioning session and improving system scalability.

These and other embodiments are discussed below with reference to FIGS. 1 to 7C. However, those skilled in the art will readily appreciate that the detailed description given herein with respect to these FIGS. is for explanatory purposes only and should not be construed as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) radio access technologies (RATs). In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1:
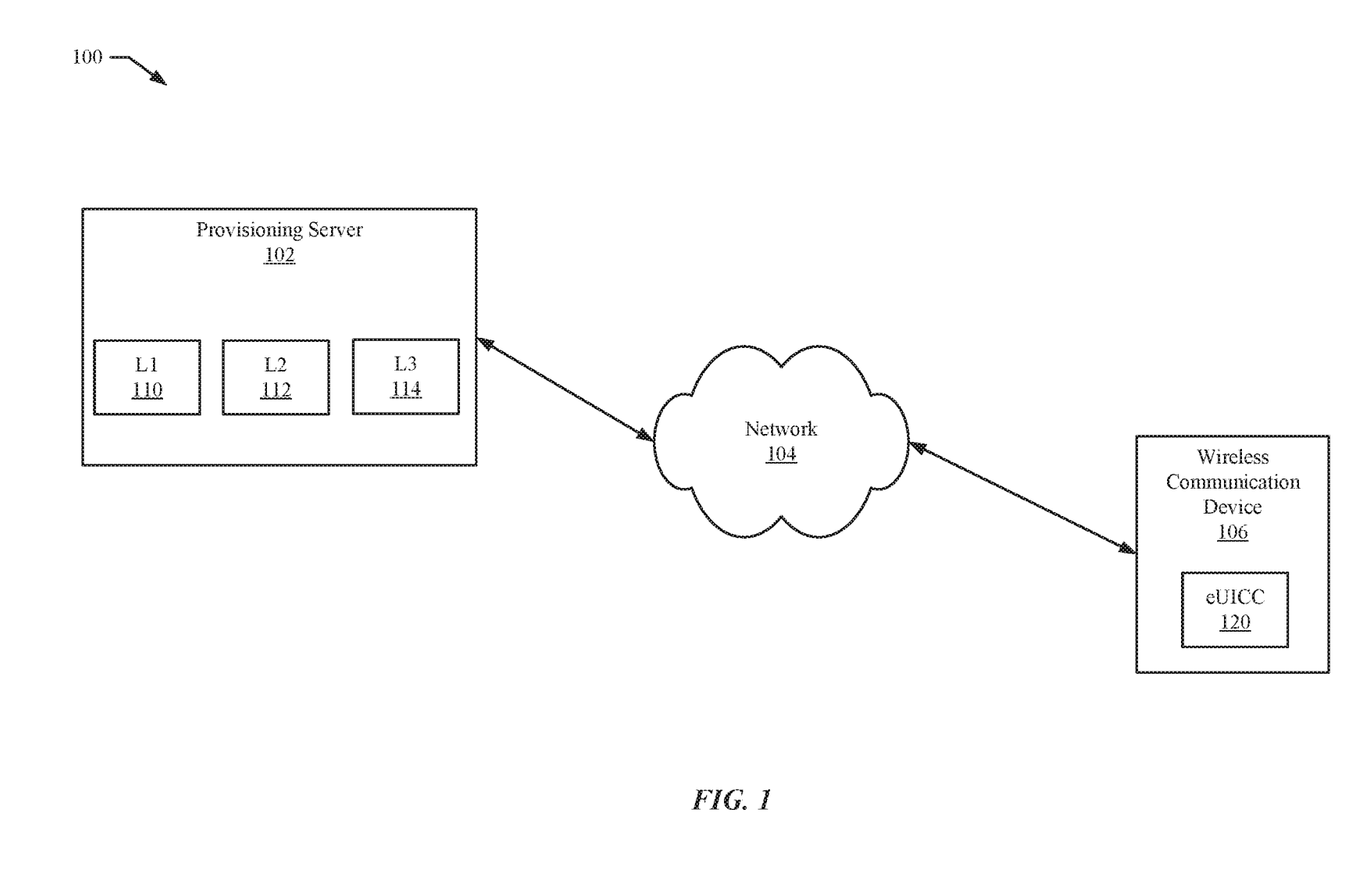
FIG. 1 illustrates an example system for eSIM provisioning in accordance with some example embodiments.

FIG. 1 illustrates an example system 100 for eSIM provisioning in accordance with some example embodiments. The system 100 can include a provisioning server 102 and one or more wireless communication devices 106, which can communicate over a network 104.

The provisioning server 102 can be embodied as one or more computing devices that can be configured to generate and/or provision eSIMs to eUICCs (e.g., eUICC 120) implemented on wireless communication devices 106 in accordance with various example embodiments. The provisioning server 102 can, for example, be comprise one or more physical servers, a cloud computing infrastructure configured to implement functionality of the provisioning server 102 (e.g., a virtual computing system implemented on underlying physical hardware), and/or other server device(s). In embodiments in which functionality of the provisioning server 102 is provided by multiple physical computing devices, the computing devices can be co-located in a common location, or can be distributed across multiple physical locations and can communicate via the network 104. The provisioning server 102 can be hosted/operated by any entity that can maintain and provision a pool of eSIMs, such as by way of non-limiting example, a mobile network operator(s), a device manufacturer, a device vendor, or other such entity.

The network 104 can be embodied as any network or combination of networks configured to support communication between two or more computing devices, such as provisioning server 102 and the wireless communication device 106. By way of non-limiting example, the network 104 can comprise one or more wireline networks, one or more wireless network (e.g., a cellular network(s), wireless local area network(s), wireless wide area network(s), wireless metropolitan area network(s), some combination thereof, or the like), or a combination thereof, and in some example embodiments can comprise the Internet.

The wireless communication device 106 can be embodied as any computing device that can be configured to access a cellular network. By way of non-limiting example, the wireless communication device 106 can be embodied as a cellular phone, such as a smart phone, a tablet computing device, a digital media player device, a cellular wireless hotspot device, a laptop computer, some combination thereof, or the like. As a further example, the wireless communication device 106 can be embodied as a machine-to-machine (M2M) device or the like that can be configured (e.g., via a SIM) to access a cellular network.

The wireless communication device 106 can include an eUICC 120, which can also be referred to as a "secure element." In some embodiments, the eUICC 120 can be embedded within (e.g., soldered to) a main system board of the wireless communication device 106. In some example embodiments, the eUICC 120 can comprise a sandboxed hardware/software environment that cannot be directly accessed by external entities, such as a main, or host, operating system (OS) that can be executed on the wireless communication device 106. The eUICC 120 can include processing circuitry, such as a microprocessor, and a storage device that can work together to process commands and carry out various authentication mechanisms that can be used to enable the wireless communication device 106 to access a mobile network operator's network. In this regard, the eUICC 120 can be configured to maintain one or more eSIMs, such as an eSIM that can be provisioned by the provisioning server 102. The eUICC 120 can be configured to use an eSIM installed on the eUICC 120 to facilitate network authentication for accessing a mobile operator's network.

The wireless communication device 106, and thus an eSIM that can be provisioned by the provisioning server 102 and/or installed on the eUICC 120 can be configured for accessing networks using any of a variety of radio access technologies (RATs). By way of non-limiting example, the wireless communication device 106 and/or an eSIM in accordance with some example embodiments can support a Long Term Evolution (LTE) radio access technology (RAT), such as various releases of the LTE standard specified by the Third Generation Partnership Project (3GPP), including various releases of LTE, LTE-Advanced (LTE-A), and/or other present or future releases using LTE technology. As another example, the wireless communication device 106 and/or an eSIM in accordance with some example embodiments can support a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1×RTT; and/or the like. As another example, the wireless communication device 106 and/or an eSIM in accordance with some example embodiments can support a second generation (2G) cellular RAT, such as a Global System for Mobile Communications (GSM) RAT. It will be appreciated that the foregoing RATs are provided by way of example, and not by way of limitation. In this regard, the wireless communication device 106 and/or an eSIM in accordance with some example embodiments can be configured to communicate via any present or future developed cellular RAT, including, for example, various fifth generation (5G) RATs now in development.

As described previously, the provisioning server 102 can be configured to provision an eSIM to the eUICC 120 via the network 104. This provisioning can, for example, be accomplished using various over-the-air (OTA) techniques. Additionally or alternatively, in some example embodiments, the wireless communication device 106 can be connected to the network 104 and/or directly to the provisioning server 102 via a wireline connection and an eSIM can be provisioned to the eUICC 120 via the wireline connection. An eSIM provisioned to the eUICC 120 can be included in an eSIM package that can be generated and formatted by the provisioning server 102 in accordance with various embodiments described further herein below. The eUICC 120 can be configured to unpack the eSIM from the eSIM package and install the eSIM on the eUICC 120.

In some example embodiments, the provisioning server 102 and eUICC 120 can be configured to implement and/or otherwise support one or more logical security layers that can implement security mechanisms for the provisioning process. For example, the provisioning server 102 of some example embodiments can be configured to implement one or more of a level 1 (L1) entity 110, level 2 (L2) entity 112, or level 3 (L3) entity 114. The eUICC 120 of some example embodiments can locally implement logical security layers and/or processes (e.g., L1, L2, and/or L3) corresponding to the logical security entities of the provisioning server 102. In accordance with some example embodiments, L1 (e.g., the L1 entity 110 and any corresponding L1 layer/process on the eUICC 120) can provide encryption services; L2 (e.g., the L2 entity 112 and any corresponding L2 layer/process on the eUICC 120) can provide anti-cloning services; and L3 (e.g., the L3 entity 114 and any corresponding L3 layer/process on the eUICC 120) can provide authorization services. In some example embodiments, two or more of the L1 entity 110, L2 entity 112, and L3 entity 114 can be implemented as a logical software entity running on a common physical server or set of servers. Alternatively, in some example embodiments, individual logical security entity, such as individual ones of the L1 entity 110, L2 entity 112, and/or L3 entity 114 can be implemented on physical server(s) that is discrete from a server(s) implementing another logical security entity.

Figure 2:
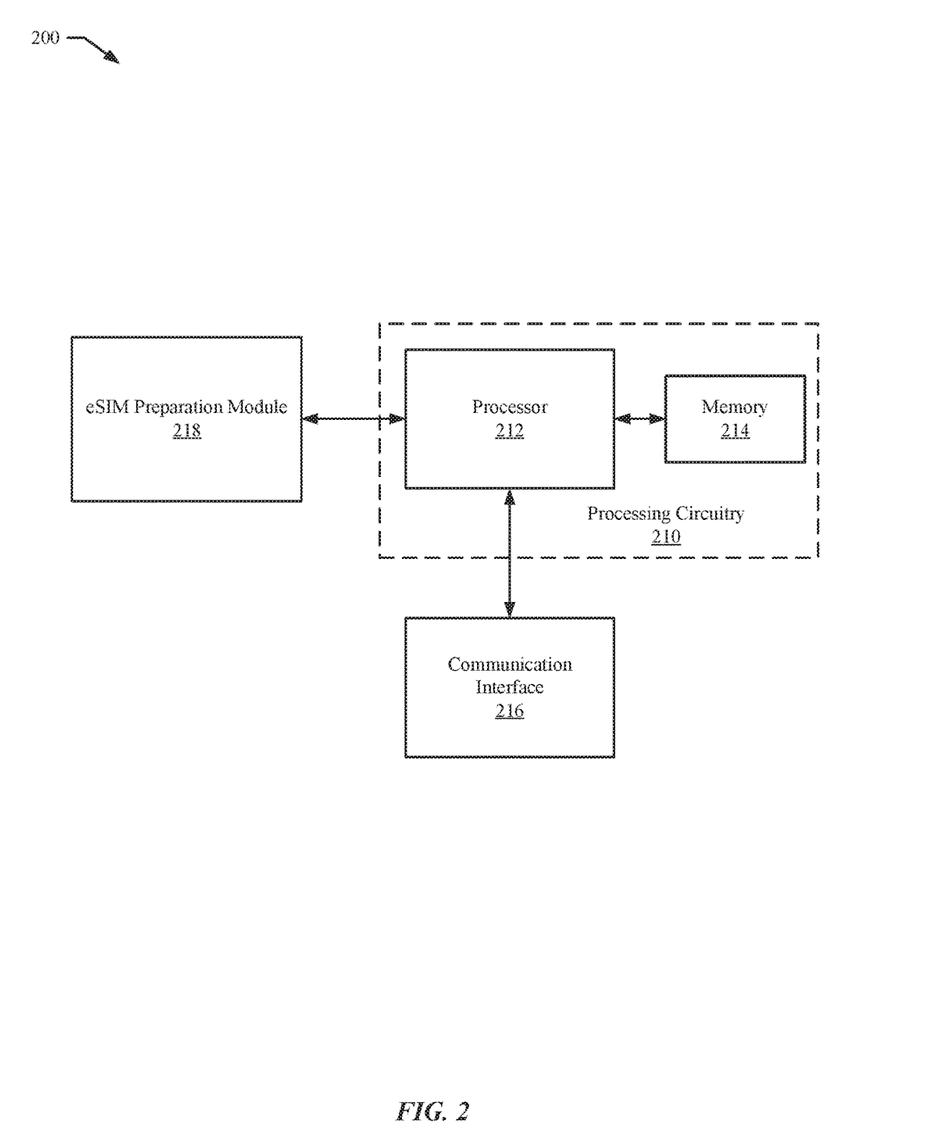
FIG. 2 illustrates a block diagram of an apparatus that can be implemented on a provisioning server in accordance with some example embodiments.

FIG. 2 illustrates a block diagram of an apparatus 200 that can be implemented on a provisioning server, such as provisioning server 102, in accordance with some example embodiments. In this regard, the apparatus 200 can be implemented on any computing device or plurality of computing devices that can collectively be configured to implement functionality of the provisioning server 102. As such, it will be appreciated that one or more of the components illustrated in and described with respect to FIG. 2 can be implemented on a single computing device, or can be distributed across a plurality of computing devices that may collectively provide functionality of the provisioning server 102 in accordance with one or more example embodiments. It will additionally be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of a provisioning server, such as provisioning server 102, in accordance with various example embodiments. Thus, the processing circuitry 210 may be configured to perform data processing, application execution and/or other processing and management services that can be implemented for preparing and provisioning an eSIM according to one or more example embodiments, such as illustrated in and described below with respect to FIGS. 4, 6, and 7A to 7C.

In some embodiments, the apparatus 200 or a portion(s) or component(s) thereof, such as the processing circuitry 210, can be implemented via one or more integrated circuits, each of which can include one or more chips. The processing circuitry 210 and/or one or more further components of the apparatus 200 can therefore, in some instances, be configured to implement an embodiment on an integrated circuit (e.g., as a "system on a chip").

In some example embodiments, the processing circuitry 210 can include a processor 212 and, in some embodiments, such as that illustrated in FIG. 2, can further include memory 214. The processing circuitry 210 can be in communication with or otherwise control a communication interface 216 and/or eSIM preparation module 218.

The processor 212 can be embodied in a variety of forms. For example, the processor 212 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the provisioning server 102. In some embodiments in which the apparatus 200 is embodied on a plurality of computing devices, a plurality of processors, which can collectively form the processor 212, can be distributed across a plurality of computing devices that can be in operative communication with each other directly and/or via a network, such as the network 104. In some example embodiments, the processor 212 can be configured to execute instructions that may be stored in the memory 214 and/or that can be otherwise accessible to the processor 212. As such, whether configured by hardware or by a combination of hardware and software, the processor 212 can be capable of performing operations according to various embodiments while configured accordingly.

In some example embodiments, the memory 214 can include one or more memory and/or other storage devices. Memory 214 can include fixed and/or removable memory devices. In embodiments in which the memory 214 includes a plurality of memory devices, the plurality of memory devices can be embodied on a single computing device, or can be distributed across a plurality of computing devices (e.g., a plurality of computing devices forming the provisioning server 102 of some example embodiments), which can collectively provide functionality of the apparatus 200. In some embodiments, the memory 214 can comprise a non-transitory computer-readable storage medium that can store computer program instructions that can be executed by the processor 212. In this regard, the memory 214 can be configured to store information, data, applications, instructions and/or the like for enabling the apparatus 200 to carry out various functions of the provisioning server 102 in accordance with one or more example embodiments. For example, the memory 214 of some example embodiments can be configured to store one or more eSIMs that can be available for provisioning to an eUICC, such as eUICC 120. The memory 214 can additionally or alternatively store parameters associated with various eUICCs, which can be used to facilitate preparing and packaging an eSIM for provisioning as described further herein below. In some embodiments, the memory 214 can be in communication with one or more of the processor 212, communication interface 216, or eSIM preparation module 218 via one or more buses for passing information among components of the apparatus 200.

The apparatus 200 can further include a communication interface 216. The communication interface 216 can be configured enable the apparatus 200 to communicate with another computing device, such as over the network 104. In this regard, the communication interface 216 can include one or more interface mechanisms for enabling communication with other devices and/or networks. As such, the communication interface 216 can include, for example, an antenna (or multiple antennas) and supporting hardware and/or software for enabling communications with a wireless communication network (e.g., a cellular network, Wi-Fi, Li-Fi, WLAN, and/or other wireless communication network) and/or a communication modem or other hardware/software for supporting communication via cable, digital subscriber line (DSL), USB, FireWire, Ethernet, one or more optical transmission technologies, and/or other wireline networking methods. Thus, for example, the communication interface 216 can be configured to support communication with the wireless communication device 106 and/or eUICC 120 implemented thereon via the network 104 to enable the provisioning server 102 to participate in an eSIM provisioning session provision and provision an eSIM to the eUICC 120.

The apparatus 200 can further include eSIM preparation module 218. The eSIM preparation module 218 can be embodied as various means, such as circuitry, hardware, a computer program product comprising a computer readable medium (for example, the memory 214) storing computer readable program instructions executable by a processing device (for example, the processor 212), or some combination thereof. In some embodiments, the processor 212 (or the processing circuitry 210) can include, or otherwise control the eSIM preparation module 218. The eSIM preparation module 218 of some example embodiments can be configured to prepare and provision an eSIM according to one or more example embodiments, such as illustrated in and described below with respect to FIGS. 4, 6, and 7A to 7C.

Figure 3:
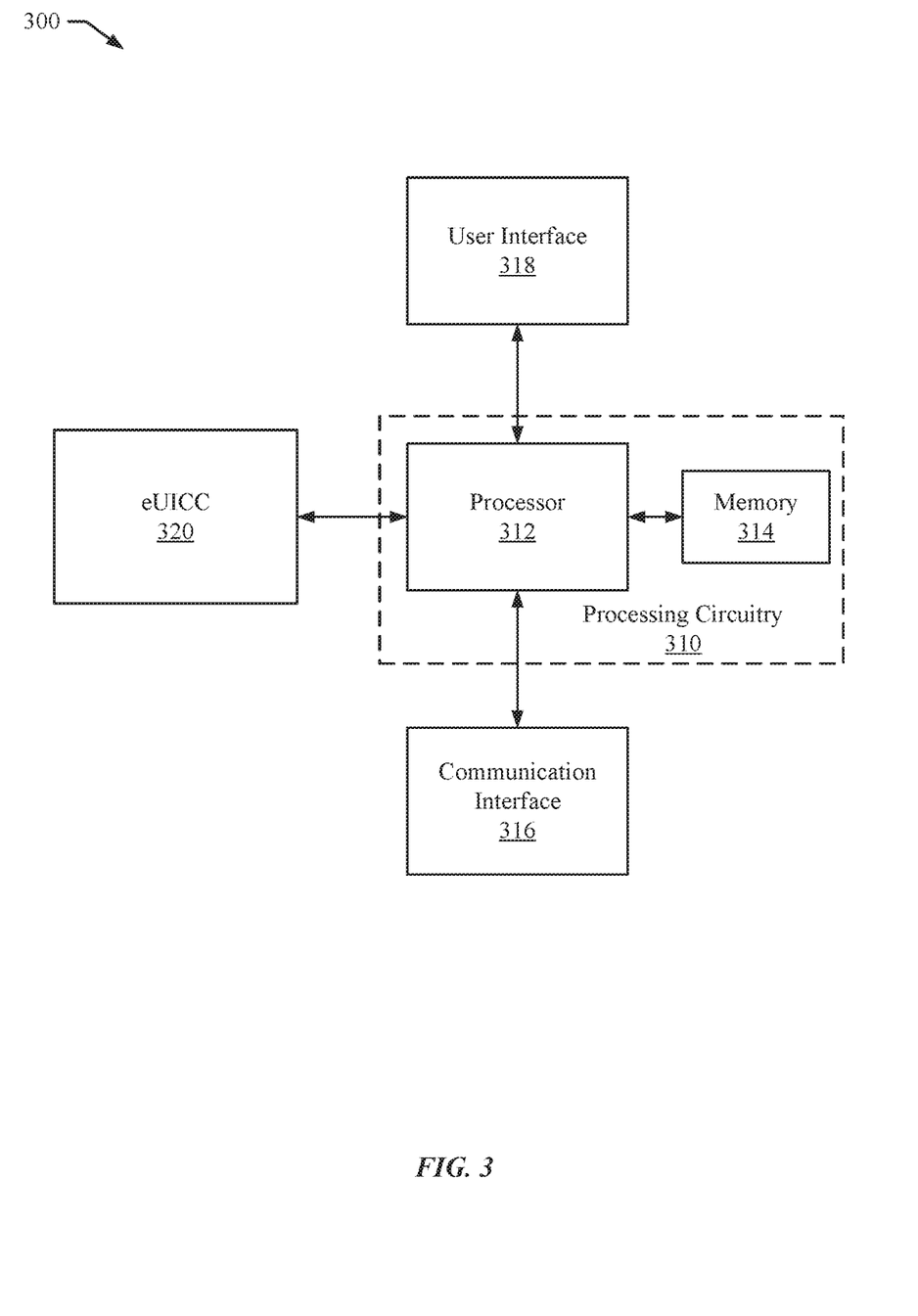
FIG. 3 illustrates a block diagram of an apparatus that can be implemented on a wireless communication device in accordance with some example embodiments.

FIG. 3 illustrates a block diagram of an apparatus 300 that can be implemented on a wireless communication device, such as wireless communication device 106, in accordance with some example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments. For example, in some embodiments, the processing circuitry 310 can be configured to support operation of a main host operating system of a wireless communication device.

In some embodiments, the apparatus 300 or a portion(s) or component(s) thereof, such as the processing circuitry 310, can be implemented via one or more integrated circuits, each of which can include one or more chips. The processing circuitry 310 and/or one or more further components of the apparatus 300 can therefore, in some instances, be configured to implement an embodiment on an integrated circuit (e.g., as a "system on a chip"). In some example embodiments, one or more components of the apparatus 300 can be implemented on a chipset capable of enabling a computing device to access a network, such as network 104, when implemented on or otherwise operably coupled to the computing device. In some such example embodiments, the apparatus 300 can include a cellular baseband chipset, which can be configured to enable a computing device, such as wireless communication device 106, to operate on one or more cellular networks.

In some example embodiments, the processing circuitry 310 can include a processor 312 and, in some embodiments, such as that illustrated in FIG. 3, can further include memory 314. The processing circuitry 310 can be in communication with or otherwise control the communication interface 316 and/or user interface 318.

The processor 312 can be embodied in a variety of forms. For example, the processor 312 can be embodied as various hardware-based processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the wireless communication device 106 as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, user interface 318, or eUICC 320 via one or more buses for passing information among components of the apparatus 300.

The apparatus 300 can further include a communication interface 316. The communication interface 316 of some example embodiments can provide a wireless communication interface configured to enable the apparatus 300 to send wireless signals to and receive signals from one or more wireless networks. For example, the communication interface 316 of some example embodiments can be configured to support access to a cellular network by enabling wireless communication with a cellular base station. The communication interface 316 can accordingly include one or more transceivers and supporting hardware and/or software for enabling communication in accordance with one or more cellular RATs. The communication interface 316 of some embodiments can further include one or more transceivers and/or other radio components to support one or more further wireless communication technologies, such as Wi-Fi (e.g., an IEEE 802.11 technology), Bluetooth, and/or other wireless communications technology. In some example embodiments, the communication interface 316 can additionally include a communication modem or other hardware/software for supporting communication via cable, digital subscriber line (DSL), USB, FireWire, Ethernet, one or more optical transmission technologies, and/or other wireline networking methods.

In some example embodiments, the apparatus 300 may include the user interface 318. It will be appreciated, however, that in some example embodiments, one or more aspects of the user interface 318 may be omitted, and in some embodiments, the user interface 318 may be omitted entirely. The user interface 318 can be in communication with the processing circuitry 310 to receive an indication of a user input and/or to provide an audible, visual, mechanical, or other output to a user. As such, the user interface 318 can include, for example, a keyboard, a mouse, a joystick, a display, a touch screen display, a microphone, a speaker, one or more biometric input devices, and/or other input/output mechanisms. In embodiments wherein the user interface 318 comprises a touch screen display, the user interface 318 can additionally be configured to detect and/or receive an indication of a touch and/or other movement gesture or other input to the display.

The apparatus 300 can further include the eUICC 320, which can, for example, comprise an embodiment of the eUICC 120. The eUICC 320 can accordingly include processing circuitry and a storage device that can be configured to store and manage one or more eSIMs, such as can be provisioned by the provisioning server 102 in accordance with various example embodiments. The eUICC 320 can be configured to unpack and install an eSIM provisioned by the provisioning server 102 in accordance with various example embodiments, such as illustrated in and described below with respect to FIGS. 5 and 6.

Figure 4:
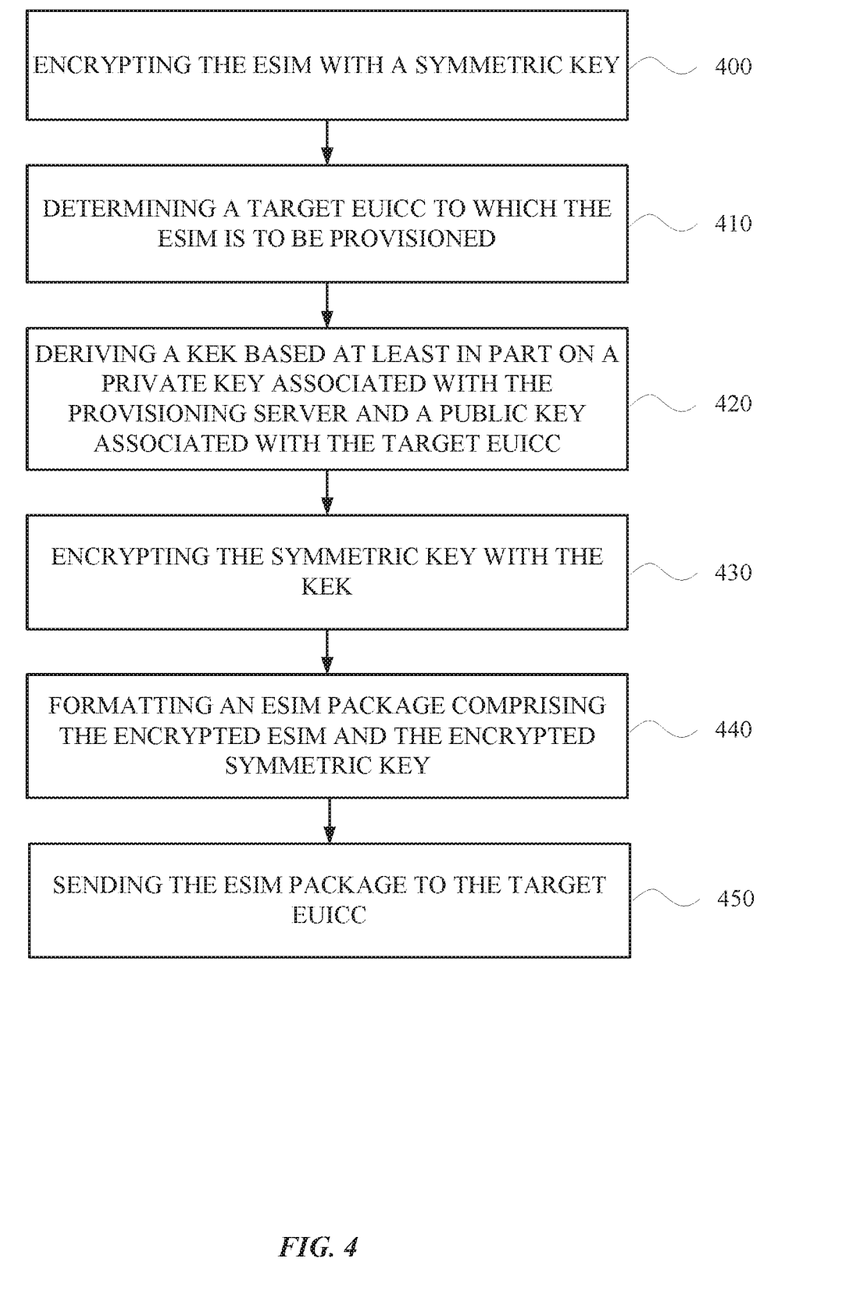
FIG. 4 illustrates a flowchart according to an example method for preparing an eSIM for provisioning in accordance with some example embodiments.

FIG. 4 illustrates a flowchart according to an example method for preparing an eSIM for provisioning in accordance with some example embodiments. In this regard, FIG. 4 illustrates a method that can be performed by the provisioning server 102 of some example embodiments. One or more of processing circuitry 210, processor 212, memory 214, communication interface 216, and eSIM preparation module 218 can, for example, provide means for performing the operations illustrated in and described with respect to FIG. 2.

Operation 400 can include encrypting an eSIM with a symmetric key. The symmetric key can be generic with respect to (e.g., unassociated with) any particular eUICC. As such, encryption of the eSIM can be performed prior to and/or otherwise without identification of a specific target eUICC. In some embodiments, the symmetric key can be a single use key that can be generated for encrypting a single eSIM. However, in some embodiments, a single symmetric key can be used for encryption of multiple eSIMs.

Operation 410 can include determining a target eUICC (e.g., the eUICC 120) to which the eSIM is to be provisioned. Operation 410 can, for example, be performed in response to establishment of an eSIM provisioning system, such as can be initiated by the wireless communication device 106 and/or eUICC 120. Thus, for example, operation 410 can include retrieving a pre-encrypted eSIM in response to establishment of a provisioning session for provisioning an eSIM to the eUICC 120.

In some example embodiments, the provisioning server 102 can pre-store one or more parameters associated with the eUICC 120. For example, the provisioning server 102 can maintain a database and/or other data structure storing a plurality of parameter sets, each of which can be associated with a respective eUICC. The parameters for each such eUICC can, for example, be shared by the eUICC and/or otherwise pre-stored prior to distribution and/or sale of the wireless communication device and, in some cases, can be pre-stored prior to integration of the eUICC into the wireless communication device. In embodiments in which one or more parameters for the eUICC 120 are pre-stored, the parameters can include parameters that can be used to derive a key encryption key (KEK), such as described with respect to operation 420, and/or for otherwise supporting the provisioning of an eSIM to the eUICC 120. As such, when the eUICC 120 is determined to be the target eUICC, the corresponding parameter set can be retrieved from memory. For example, in some embodiments, a public key ($PK_{eUICC}$) associated with the eUICC can be used. The public key ($PK_{eUICC}$) can be part of a public-private key pair associated with the eUICC, and a corresponding secret key ($SK_{eUICC}$) can be maintained in secret on the eUICC 120. In some embodiments, the public key ($PK_{eUICC}$) can be generated by the eUICC 120 as a "one-time" ephemeral public key. In some embodiments, the public key ($PK_{eUICC}$) can be a "static" public key associated with the eUICC 120 (and in some embodiments stored on the eUICC 120), where the "static" public key ($PK_{eUICC}$) can be re-used for multiple provisioning sessions.

As a further example, one or more security random values, which can be used to support various security levels, and/or information that can be used to calculate such security random values can be pre-stored. These security random values can be single-use values that can be used to implement one or more levels of security for eSIM provisioning. As a more particular example, in some embodiments a data random (DR) value that can be an L1 security value used by the eUICC 120 to support L1 security and/or information that can be used to calculate the DR value can be pre-stored. As another particular example, in some embodiments, a L2 security value, such as an L2 challenge, that can be used for L2 security purposes can be pre-stored. When the public key is an ephemeral public key, the use of DR values may be not required, as entropy for the eUICC is already provided by the use of a one-time ephemeral public key.

Operation 420 can include deriving a key encryption key (KEK). The KEK can be a shared secret that can be independently derivable by the eUICC 120, such as described with respect to FIG. 5.

The KEK can be derived based at least in part on a private key associated with the provisioning server 102 and the public key $PK_{eUICC}$. The private key associated with the provisioning server 102 can be part of a public-private key pair that can be generated by the provisioning server 102. In some example embodiments, the public-private key pair associated with the provisioning server 102 can be an ephemeral key pair that can be generated for one-time use for provisioning the eSIM to the eUICC 120. In some example embodiments, alternatively, the provisioning server 102 can reuse a key pair for provisioning multiple eSIMs. In embodiments in which the public key $PK_{eUICC}$ is pre-stored, the pre-stored $PK_{eUICC}$ value can be used. Additionally or alternatively, in some embodiments, the eUICC 120 can furnish a public key value (e.g., provide the $PK_{eUICC}$) to the provisioning server 102 during the provisioning session. The public key value $PK_{eUICC}$ provided by the eUICC 120 to the provisioning server 102 can be either a one-time "ephemeral" public key generated by the eUICC 120 for use only during the particular provisioning session or a "static" public key that is reused by the eUICC 120 for multiple provisioning sessions with the provisioning server 102. The use of "ephemeral" public keys provides for a degree of forward secrecy, and in particular, when both the eUICC 120 and the provisioning server 102 each use "ephemeral" public keys, perfect forward secrecy can be achieved. With only one side using an ephemeral public key, partial forward secrecy can be achieved.

In some example embodiments, the KEK can be optionally derived further based on a DR value associated with the eUICC 120. The DR value can be a random value that can be used to introduce additional entropy into key derivation for increased security. As noted, the DR value can be pre-stored by the provisioning server 102 in some example embodiments. For example, in such embodiments, the eUICC 120 can generate a DR value in advance and both locally store the DR value and share the DR value with the provisioning server 102 for later use when the eUICC 120 is provisioned with an eSIM. Additionally or alternatively, in some example embodiments, the DR value associated with the eUICC 120 can be a pseudo-random number that can be calculated based on a pseudo-random function. In some such embodiments, the pseudo-random function and one or more seed values (e.g., a nonce) can be pre-shared with and maintained by the provisioning server 102 to enable the provisioning server 102 to calculate the DR value. If synchronization in DR values is lost between the provisioning server 102 and eUICC 120, such as a result of a failed provisioning attempt, the provisioning server 102 can use the pseudo-random function and seed(s) to calculate and try multiple DR values in order to regain synchronization.

In some example embodiments, in which the KEK is derived based on a DR value in addition to the secret key associated with the provisioning server 102 and the $PK_{eUICC}$, an L2 security value associated with the eUICC 120, such as the L2 challenge, can be substituted for the DR value in the derivation such that L1 security and L2 security can be collapsed together, e.g., a single random value can be used for both L1 security (e.g., encryption) and for L2 security (e.g., anti-cloning). In embodiments in which an L2 security value is substituted for a DR value in the KEK derivation, the substitution can be known to the eUICC 120 (e.g., through prior configuration) such that the eUICC 120 can derive the same shared secret.

Derivation of the KEK can be performed using Diffie-Hellman techniques, the Elliptic Curve Key Agreement Algorithm (ECKA), and/or another key agreement protocol by which a shared secret can be derived. In some example embodiments, the KEK can be derived without requiring real-time involvement of the eUICC 120 (e.g., the KEK can be derived "offline"), as one or more parameters associated with the eUICC 120, such as the $PK_{eUICC}$ and/or a DR value, which can be used for derivation of the KEK can be pre-stored by the provisioning server 102. In some example embodiments, the KEK can be derived during the provisioning session. Additionally or alternatively, in some example embodiments, the KEK can be derived prior to initiation of a provisioning session for provisioning the eSIM to the eUICC 120, and can be stored in the parameter set associated with the eUICC 120 and retrieved in response to initiation of the provisioning session.

Operation 430 can comprise encrypting the symmetric key with the KEK. In some example embodiments, operation 430 can be performed in real-time during the provisioning session.

Operation 440 can comprise formatting an eSIM package comprising the encrypted eSIM (e.g., as encrypted with the symmetric key in operation 400) and the encrypted symmetric key (e.g., as encrypted with the KEK in operation 430). The eSIM package can further include a public key associated with the provisioning server 102 (e.g., the public key of the public-private key pair including the private key used to derive the KEK). In this regard, the public key can be included to enable the eUICC 120 to derive the KEK, as described with respect to FIG. 5. In some example embodiments, operation 440 can be performed in real-time during the provisioning session.

Operation 450 can include providing the eSIM package to the eUICC 120, such as via the network 104.

It will be appreciated that the operations illustrated in and described with respect to FIG. 4 are not limited to the illustrated order. In this regard, various operations can be performed concurrently and/or in a different order than that illustrated in FIG. 4. For example, as mentioned, in some embodiments, the KEK can be derived prior to determining the target eUICC (e.g., offline), and thus operation 420 can be performed prior to operation 410, in some example embodiments.

It will be appreciated that any public-key encryption algorithm can be used for shared secret derivation and encryption can be used for derivation of the KEK and encryption of the symmetric key. By way of non-limiting example, Elliptic Curve Cryptography (ECC) techniques can be used, in some example embodiments, for encryption of the symmetric key. ECC can offer advantages in terms of lower processing overhead and increased speed for encrypting the symmetric key compared to alternative techniques. It will be appreciated, however, that other public-key encryption algorithms, such as an Rivest/Shamir/Adleman (RSA) asymmetric algorithm can be used in addition to, or in lieu of, ECC, in accordance with some example embodiments.

Figure 5:
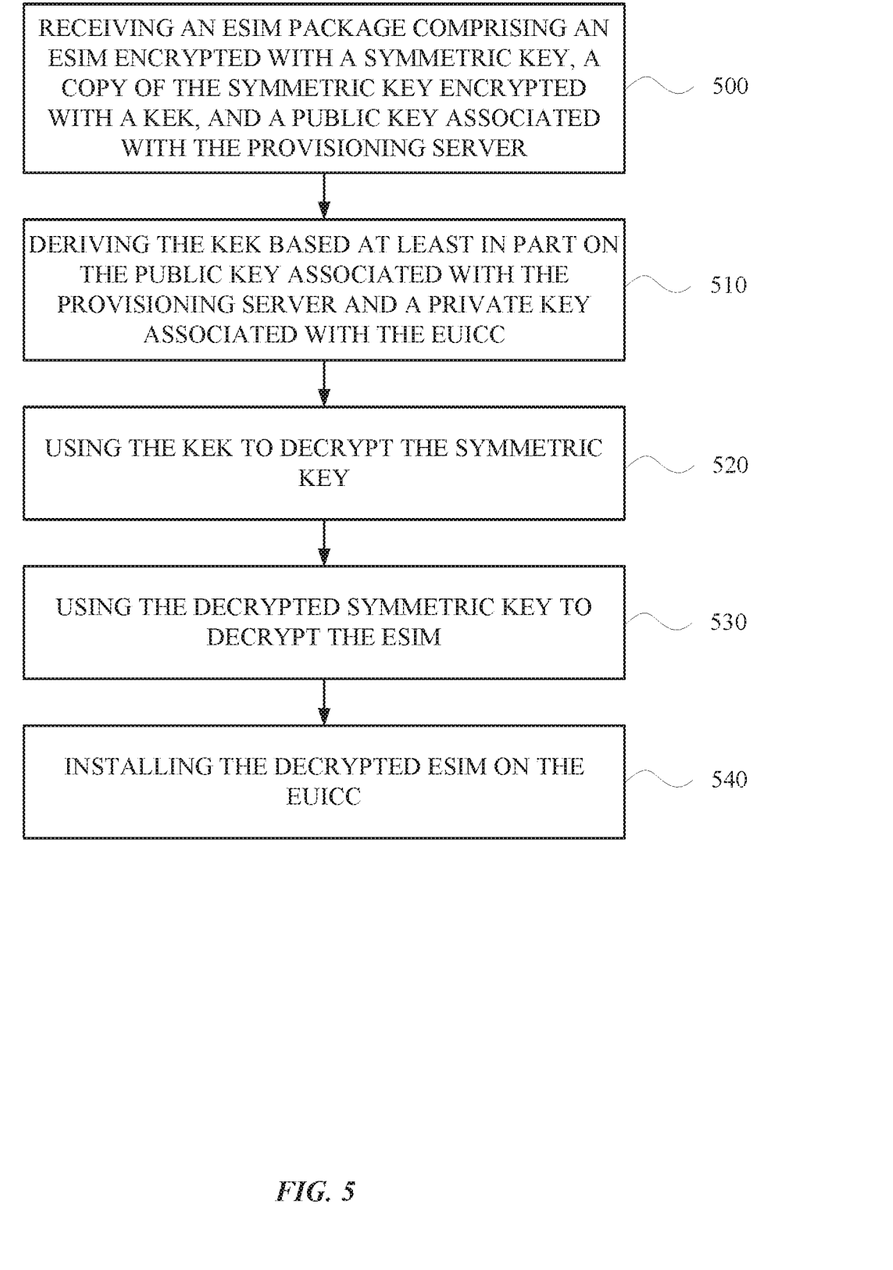
FIG. 5 illustrates a flowchart according to an example method for unpacking and installing an eSIM in an eUICC in accordance with some example embodiments.

FIG. 5 illustrates a flowchart according to an example method for unpacking and installing an eSIM in an eUICC, such as the eUICC 120, in accordance with some example embodiments. Operation 500 can include the eUICC 120 receiving an eSIM package. The eSIM package can comprise an eSIM encrypted with a symmetric key, a copy of the symmetric key encrypted with a KEK, and a public key associated with the provisioning server 102. In this regard, operation 500 can comprise receiving an eSIM package that can be formatted and sent to the eUICC 120 in accordance with the method described with respect to FIG. 4.

Operation 510 can comprise the eUICC 120 deriving the KEK based at least in part on the public key associated with the provisioning server and on a private key associated with the eUICC ($SK_{eUICC}$). In some example embodiments, the eUICC 120 can derive the KEK further based on a DR value that can be generated by and/or otherwise known to the eUICC 120. As described above with respect to FIG. 4, the DR value and/or information needed to derive the DR value can be pre-shared with the provisioning server 102 such that the provisioning server 102 and eUICC 120 can use the same DR value for derivation of KEK. As also described with respect to FIG. 4, the public key associated with the provisioning server can be part of an ephemeral key pair that can be generated for a one-time use for provisioning the eSIM to the eUICC 120. Is some embodiments, alternatively, the public key associated with the provisioning server can be part of a key pair that is reused to provision multiple eSIMs.

Operation 510 can be performed using any key agreement protocol, such as by way of non-limiting example, Diffie-Hellman techniques, the Elliptic Curve Key Agreement Algorithm (ECKA), and/or other key agreement protocol that can be used to derive a shared secret. However, in accordance with various example embodiments, the KEK can be derived by the eUICC 120 independent of a "real-time" interactive involvement with the provisioning server 102, e.g., based on a combination of parameters known to the eUICC 120 and information included in the provisioned eSIM package provided to the eUICC 120 by the provisioning server 102.

Operation 520 can include the eUICC 120 using the KEK to decrypt the symmetric key included in the eSIM package. Operation 530 can, in turn, include the eUICC 120 using the decrypted symmetric key to decrypt the eSIM. Operation 540 can include the eUICC 120 installing the decrypted eSIM on the eUICC 120.

An example of preparing and provisioning an eSIM according to some example embodiments will now be described with respect to FIGS. 6 and 7A to 7C. In this regard, FIG. 6 illustrates an example flow of operations for provisioning an eSIM and FIGS. 7A to 7C illustrate formatting of an eSIM package for provisioning to a target eUICC in accordance with the operations illustrated in FIG. 6.

Figure 6:
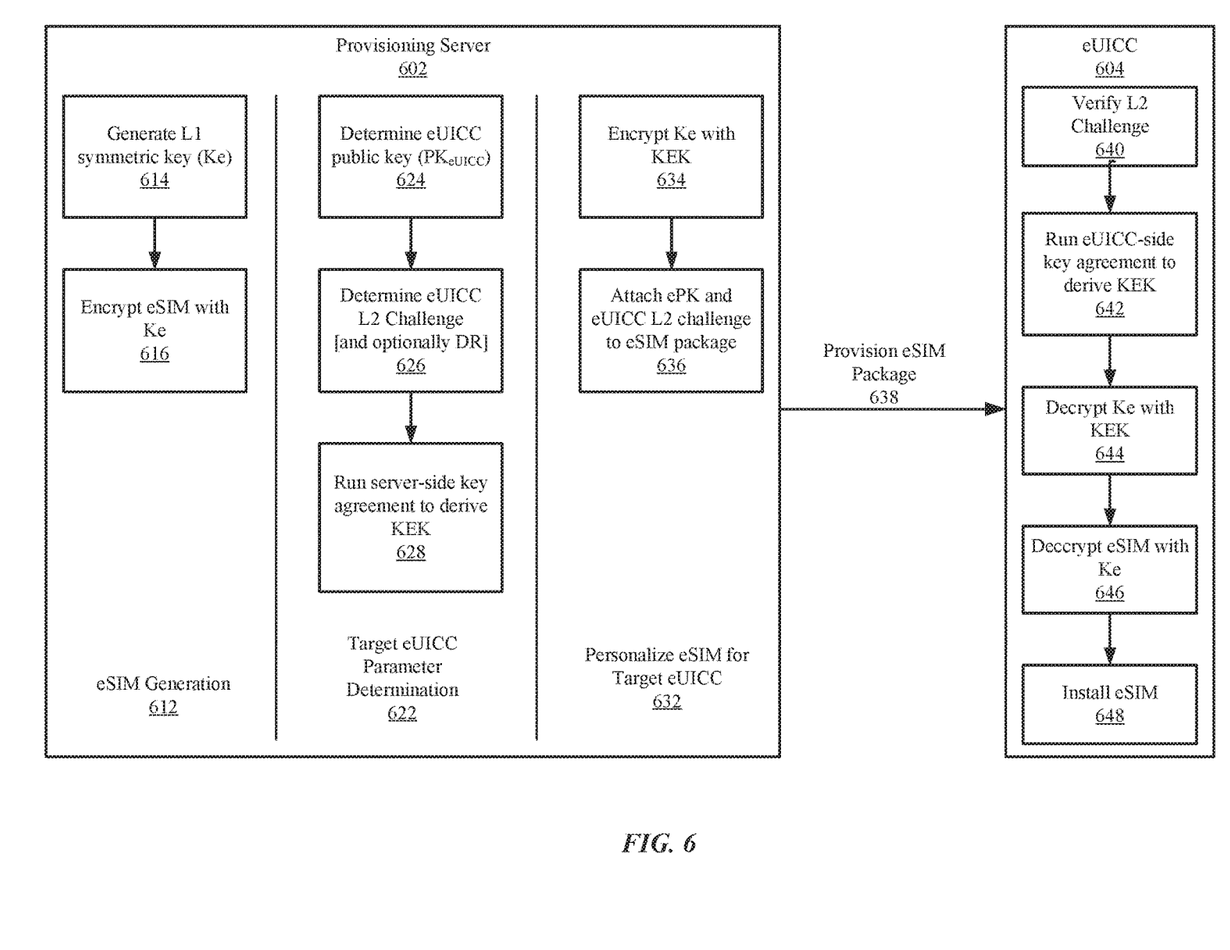
FIG. 6 illustrates an example flow of operations for provisioning an eSIM in accordance with some example embodiments.
Figure 7A:
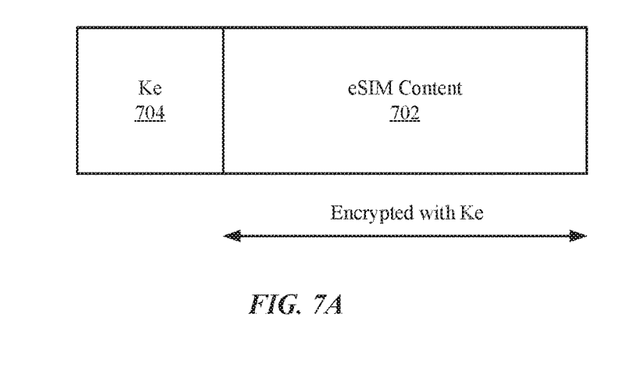
FIGS. 7A to 7C illustrate formatting of an eSIM package for provisioning to a target eUICC in accordance with some example embodiments.
Figure 7B:
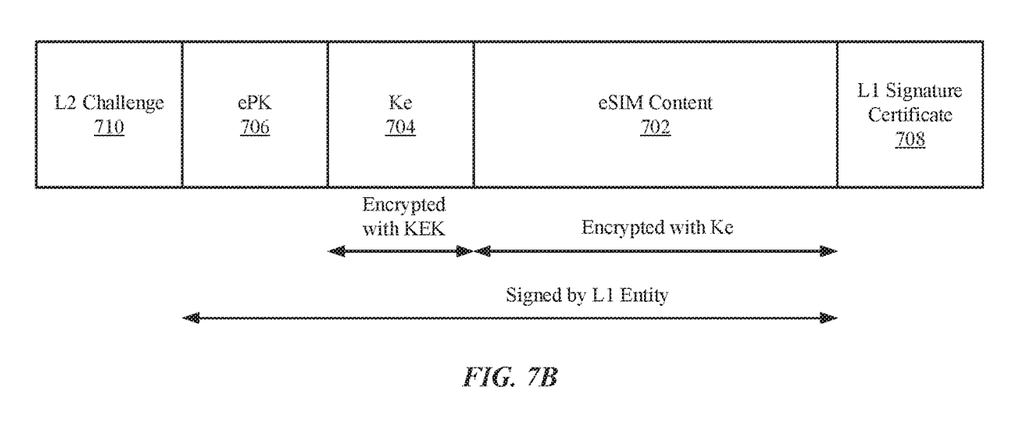
Figure 7C:
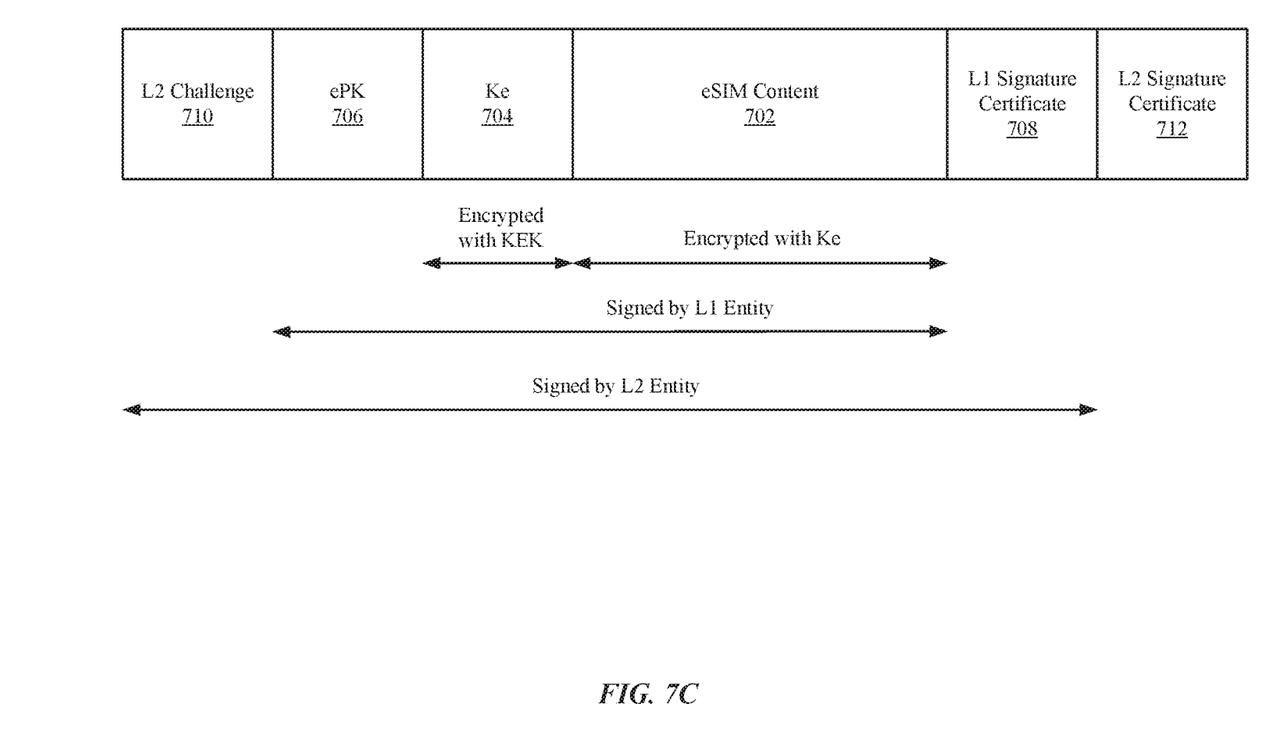

With reference to FIG. 6 a provisioning server 602 can prepare and provision an eSIM to an eUICC 604. The provisioning server 602 can, for example, comprise an embodiment of the provisioning server 102. The eUICC 604 can, for example, comprise an embodiment of eUICC 120.

The provisioning server 602 can be configured to perform an eSIM generation phase 612. The eSIM generation phase 612 can include operation 614, which can include the provisioning server 602 generating an L1 symmetric key (Ke). The eSIM generation phase 612 can further include the provisioning server 602 encrypting an eSIM with the L1 symmetric key Ke, at operation 616. Operation 616 can, for example, correspond to an embodiment of operation 400. As illustrated in FIG. 7A, the eSIM generation phase 612 can result in a partial eSIM package comprising eSIM content 702 encrypted by the L1 symmetric key Ke 704 and a copy of the L1 symmetric key Ke 704, which has not yet been encrypted.

The provisioning server 602 can be further configured to perform parameter determination 622 for the target eUICC (e.g., the eUICC 604). The parameter determination 622 can, for example, be performed in response to establishment of a provisioning session with the eUICC 604. The parameter determination 622 can be performed based at least in part on a pre-stored parameter set associated with the eUICC 604. For example, the provisioning server 602 can access a pre-stored parameter set for the eUICC 604 in response to establishment of the provisioning session. Operation 624 can include the provisioning server 602 determining the public key ($PK_{eUICC}$) for the eUICC 604. The public key ($PK_{eUICC}$) for the eUICC 604 can be part of a one-time ephemeral key pair for using during the particular provisioning session or can be a "static" public key used for multiple provisioning sessions.

Operation 626 can include the provisioning server 602 determining one or more security random values associated with the eUICC 604. For example, operation 626 can include determining the L2 challenge associated with the eUICC 604. In embodiments in which a DR value is used in the derivation of the KEK, operation 626 can further include determining the pre-stored DR value and/or calculating the DR value based on a pre-stored pseudo-random function and/or based on other information that can be used to calculate the DR value.

Operation 628 can include the provisioning server 602 performing the server-side key agreement algorithm to derive the KEK. The KEK can be derived by the provisioning server 602 based on a private key (eSK) in a public-private key pair associated with the provisioning server 602 and on the $PK_{eUICC}$. In embodiments in which DR is also used for shared secret derivation, KEK can be derived further based on the DR value that can be determined in operation 626. Operation 628 can, for example, correspond to an embodiment of operation 420.

The provisioning server 602 can use the results of the parameter determination 622 to perform personalization 632 of the eSIM for the eUICC 604. The personalization 632 can include an encryption operation 634, which can comprise the provisioning server 602 encrypting the L1 symmetric key Ke with the KEK. In this regard, operation 634 can, for example, correspond to an embodiment of operation 430. The personalization 632 can further include operation 636, which can comprise the provisioning server 602 attaching to the eSIM package the public key (ePK) of the public-private key pair associated with the provisioning server 602 and the L2 challenge for the eUICC 604.

FIG. 7B illustrates a representative eSIM package that can be formatted by the provisioning server 602 through performance of the personalization 632. As illustrated in FIG. 7B, the L1 symmetric key Ke 704 can be encrypted with the KEK and can be included in the eSIM package. The ePK 706 and the L2 challenge 710 can also be included in the eSIM package.

The personalization 632 and the formatting of the eSIM package illustrated in FIG. 7B can be at least partially performed by an L1 logical entity (e.g., an embodiment of the L1 entity 110). A portion of the eSIM package including the encrypted eSIM content 702, the encrypted L1 symmetric key Ke 704, and the public key ePK 706 can be signed by the L1 logical entity. In addition, an L1 signature certificate 708 can be included in the eSIM package, as illustrated in FIG. 7B.

Prior to provisioning the eSIM package, e.g., to the eUICC 604, the eSIM package (e.g., the encrypted eSIM content 702, encrypted Ke 704, ePK 706, L1 signature certificate 708, and L2 challenge 710) can be signed by the L2 logical entity (e.g., an embodiment of L2 entity 112). An L2 signature certificate 712 can then be added to the eSIM package, as illustrated in FIG. 7C.

Returning to FIG. 6, the final resulting eSIM package (e.g., the package illustrated in FIG. 7C) can be provisioned to the eUICC 604, in operation 638. The eUICC 604 can then unpack and install the eSIM, as illustrated in FIG. 6 and described below.

The eUICC 604 can be configured to use the L2 signature certificate 712 to verify integrity of the eSIM package. The eUICC 604 can be further configured to use the L1 signature certificate 708 to verify integrity of the portion of the eSIM package signed by the L1 entity. Provided that any such integrity checks are satisfied, the eUICC 604 can verify the L2 challenge 710, at operation 640.

If the L2 challenge is successfully verified, unpacking and installation of the eSIM can continue with operation 642. Operation 642 can include the eUICC 604 running the eUICC-side key agreement to derive the shared secret, e.g., to derive the KEK. This derivation can, for example, be based on a secure key ($SK_{eUICC}$) associated with the eUICC 604 and on the public key ePK 706. The secure key $SK_{eUICC}$ can be a private key corresponding to the public key $PK_{eUICC}$, where the private key can be used by the provisioning server 602 for server-side derivation of the KEK. In embodiments in which a DR value is also used for shared secret derivation, the KEK can be derived further based on the DR value. Operation 642 can, for example, correspond to an embodiment of operation 510.

Operation 644 can include the eUICC 604 decrypting the L1 symmetric key Ke 704 with the KEK. In this regard, operation 644 can, for example, correspond to an embodiment of operation 520.

After decrypting the L1 symmetric key Ke 704, the eUICC 604 can use the L1 symmetric key Ke 704 to decrypt the eSIM content 702, at operation 646. Operation 646 can, for example, correspond to an embodiment of operation 530.

Operation 648 can comprise the eUICC 604 installing the eSIM. In this regard, operation 648 can, for example, correspond to an embodiment of operation 540.

The various aspects, embodiments, implementations or features of the described embodiments can be used separately or in any combination. Various aspects of the described embodiments can be implemented by software, by hardware, or by a combination of hardware and software. The described embodiments can also be embodied as a computer readable medium (or mediums) storing computer readable code including instructions that can be performed by one or more computing devices. The computer readable medium may be associated with any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. An embedded Universal Integrated Circuit Card (eUICC) configurable for operation in a wireless communication device, the eUICC comprising processing circuitry and a storage device storing instructions that when executed by the processing circuitry causes the eUICC to perform a method comprising:
   receiving an electronic Subscriber Identity Module (eSIM) package comprising:
      an eSIM encrypted with a symmetric key, the symmetric key encrypted with a key encryption key (KEK), and
      a public key associated with a provisioning server;
   deriving the KEK based at least in part on the public key associated with the provisioning server and a private key associated with the eUICC;
   using the KEK to decrypt the symmetric key;
   using the symmetric key to decrypt the eSIM; and
   installing the eSIM on the eUICC.

2. The eUICC of claim 1, wherein the eUICC derives the KEK further based on a data random (DR) value associated with the eUICC.

3. The eUICC of claim 2, wherein the DR value is one of:
   a level 1 (L1) security value associated with the eUICC, or
   a level 2 (L2) security value associated with the eUICC.

4. The eUICC of claim 1, wherein execution of the instructions further causes the eUICC to verify integrity of the eSIM package using a level 2 (L2) challenge associated with the eUICC before deriving the KEK.

5. The eUICC of claim 4, wherein the eSIM package comprises an L2 signature certificate, and the eUICC verifies integrity of the eSIM package using the L2 signature certificate.

6. The eUICC of claim 5, wherein:
   the eSIM package further comprises a level 1 (L1) signature certificate, and
   execution of the instructions further causes the eUICC to verify integrity of the eSIM package using the L1 signature certificate.

7. A wireless communication device comprising:
   a communication interface configurable for communicating with a wireless network;
   an embedded Universal Integrated Circuit Card (eUICC); and
   processing circuitry communicatively coupled to the communication interface and to the eUICC, the processing circuitry comprising one or more processors and a memory storing instructions that, when executed by the one or more processors, cause the wireless communication device to perform a method comprising:
      receiving an electronic Subscriber Identity Module (eSIM) package comprising:
         an eSIM encrypted with a symmetric key, the symmetric key encrypted with a key encryption key (KEK), and
         a public key associated with a provisioning server;
      deriving the KEK based at least in part on the public key associated with the provisioning server and a private key associated with the eUICC;
      using the KEK to decrypt the symmetric key;
      using the symmetric key to decrypt the eSIM; and
      installing the eSIM on the eUICC.

8. The wireless communication device of claim 7, wherein the wireless communication device derives the KEK further based on a data random (DR) value associated with the eUICC.

9. The wireless communication device of claim 8, wherein the DR value is one of:
   a level 1 (L1) security value associated with the eUICC, or
   a level 2 (L2) security value associated with the eUICC.

10. The wireless communication device of claim 7, wherein execution of the instructions further causes the wireless communication device to verify integrity of the eSIM package using a level 2 (L2) challenge associated with the eUICC before deriving the KEK.

11. The wireless communication device of claim 10, wherein the eSIM package comprises an L2 signature certificate, and the wireless communication device verifies integrity of the eSIM package using the L2 signature certificate.

12. The wireless communication device of claim 11, wherein:
the eSIM package further comprises a level 1 (L1) signature certificate, and
execution of the instructions further causes the wireless communication device to verify integrity of the eSIM package using the L1 signature certificate.

13. An apparatus configurable for operation in a wireless communication device, the apparatus comprising:
processing circuitry including a processor and a memory storing instructions that, when executed by the processor cause the wireless communication device to install an electronic Subscriber Identity Module (eSIM) by:
verifying integrity of an eSIM package received from a provisioning server, the eSIM package comprising an eSIM encrypted with a symmetric key;
deriving a key encryption key (KEK) by running a key agreement;
decrypting the symmetric key using the KEK;
decrypting the encrypted eSIM with the symmetric key; and
installing the eSIM on an embedded Universal Integrated Circuit Card (eUICC) of the wireless communication device.

14. The apparatus of claim 13, wherein the KEK is derived based at least in part on a public key associated with the provisioning server and a private key associated with the eUICC.

15. The apparatus of claim 13, wherein the KEK is derived based at least in part on a data random (DR) value associated with the eUICC.

16. The apparatus of claim 15, wherein the DR value is one of:
a level 1 (L1) security value associated with the eUICC, or
a level 2 (L2) security value associated with the eUICC.

17. The apparatus of claim 13, wherein the integrity of the eSIM package is verified at least by using a level 2 (L2) challenge associated with the eUICC.

18. The apparatus of claim 17, wherein verification of the integrity of the eSIM package occurs before derivation of the KEK.

19. The apparatus of claim 17, wherein:
the eSIM package comprises an L2 signature certificate, and
the integrity of the eSIM package is verified at least by using the L2 signature certificate.

20. The apparatus of claim 19, wherein:
the eSIM package further comprises a level 1 (L1) signature certificate, and
the integrity of the eSIM package is verified at least by using the L1 signature certificate.

* * * * *